United States Patent [19]
Petrofsky

[11] Patent Number: 5,724,972
[45] Date of Patent: Mar. 10, 1998

[54] METHOD AND APPARATUS FOR DISTRIBUTED FOCUS CONTROL WITH SLOPE TRACKING

[75] Inventor: Joseph G. Petrofsky, Cupertino, Calif.

[73] Assignee: Acuson Corporation, Mountain View, Calif.

[21] Appl. No.: 640,550

[22] Filed: May 2, 1996

[51] Int. Cl.$^6$ .................................................. A61B 8/00
[52] U.S. Cl. ........................................................ 128/661.01
[58] Field of Search ........................ 128/660.06, 660.07, 128/660.08, 661.01; 73/625, 626

[56] References Cited

U.S. PATENT DOCUMENTS

| | | |
|---|---|---|
| 4,949,259 | 8/1990 | Hunt et al. |
| 4,974,211 | 11/1990 | Corl |
| 5,111,695 | 5/1992 | Engeler et al. |
| 5,230,340 | 7/1993 | Rhyne |
| 5,235,982 | 8/1993 | O'Donnell ................ 128/660.07 |
| 5,345,939 | 9/1994 | Engeler et al. |
| 5,353,797 | 10/1994 | Matsushima et al. |
| 5,469,851 | 11/1995 | Lipschutz |
| 5,501,219 | 3/1996 | Phelps et al. |
| 5,522,391 | 6/1996 | Beaudin et al. ............. 128/660.07 |

FOREIGN PATENT DOCUMENTS 0696791  2/1996  European Pat. Off.

OTHER PUBLICATIONS

Jeon, K., Bae, M.H., Park, S.B. and Kim, S.D., "An Efficient Real Time Focusing Delay Calculation in Ultrasonic Imaging Systems," *Ultrasonic Imaging*, (16):231–248 (Dec. 1994).

Berkhoff, A.P., Huisman, H.J., Thijssen, J.M., Jacobs, E.M.G.P., and Homan, R.J.F., "Fast Scan Conversion Algorithms for Displaying Ultrasound Sector Images," *Ultrasonic Imaging*, (16): 87–108 (Apr. 1994).

Manes, G., Tortoli, F., Andreuccetti, G., Avitabile, G., and Atzeni, C., "Synchronous Dynamic Focusing for Ultrasound Imaging," IEEE Transactions on Ultrasonics, Ferroelectrics and Frequency Control, (35):1, 14–20 (Jan. 1988).

*Primary Examiner*—George Manuel
*Attorney, Agent, or Firm*—Morrison & Foerster

[57] ABSTRACT

To overcome the disadvantages of the prior art, the present invention provides a method and apparatus for distributed focus control with slope tracking. The invention operates in the context of an ultrasonic imaging system having an array of transducers. Each transducer converts received energy into an echo signal. A beamformer of the invention dynamically focuses the received energy. The beamformer includes delay computation circuitry for computing a delay function for the echo signal at a predetermined focal range. The delay of the echo signal with respect to range has a slope. Tracking circuitry varies the delay function to track the slope, thereby determining the delay function for a next focal range. The beamformer further comprises delay circuitry for compensating for the delay function of the echo signal. The delay function is an estimated relative delay with respect to a reference delay of an echo signal from a reference transducer. Alternatively, the delay function is a compensating delay adapted to be applied to the echo signal of the transducer for which the delay function is being computed. In another embodiment, the beamformer includes decision circuitry for selecting an update value from a set of update values. Delay computation circuitry updates a delay function of the echo signal for a predetermined focal range by the selected update value to thereby provide a delay function for a next focal range. Tracking circuitry varies the plurality of update values as a function of range. In yet another embodiment, decision circuitry selects an update value from a set of update values, where the set includes a first update value and the first update value modified by a change value. The first update value can be nonzero. Delay computation circuitry updates a delay function of the echo signal for a predetermined focal range by the selected update value to thereby provide a delay function for a next focal range.

42 Claims, 5 Drawing Sheets

METHOD AND APPARATUS FOR DISTRIBUTED FOCUS CONTROL WITH SLOPE TRACKING

FIELD OF THE INVENTION

The present invention relates to ultrasound imaging systems, and more particularly to beamforming in such systems.

DESCRIPTION OF THE RELATED ART

In a phased array ultrasound imaging system, an ultrasound transducer includes an array of transducer elements. Typically, each transducer element is coupled to a separate channel, each having a transmitter and a receiver. Each transmitter outputs an ultrasound pulse through the transducer element into an object being imaged, typically the human body. The transmitted ultrasound energy is steered and focused by applying appropriate delays to the pulses transmitted from each array element, so that the transmitted energy coherently adds at a desired focal point. The transmitted ultrasound energy is partially reflected back to the transducer array by tissues and structures in the body.

The receive sensitivity pattern of the array is steered and focused in a reverse manner. The reflected ultrasound energy from an object arrives at the array elements at different times. The received signals are amplified and delayed in separate processing channels and then combined in a receive beamformer. The delay for each channel is selected so that the received beam is steered at a desired angle and focused at a desired depth. The delays may vary dynamically so as to focus the beam at progressively increasing depths as the ultrasound energy is received. The transmitted beam is scanned over a region of the body, and the signals generated by the beamformer are processed to produce an image of the region. A typical ultrasound transducer array may include 128 elements or more. Thus, the computation of the required delay for each transducer element in order to achieve dynamic focusing requires that a large number of complex calculations be performed rapidly.

Figure 1:
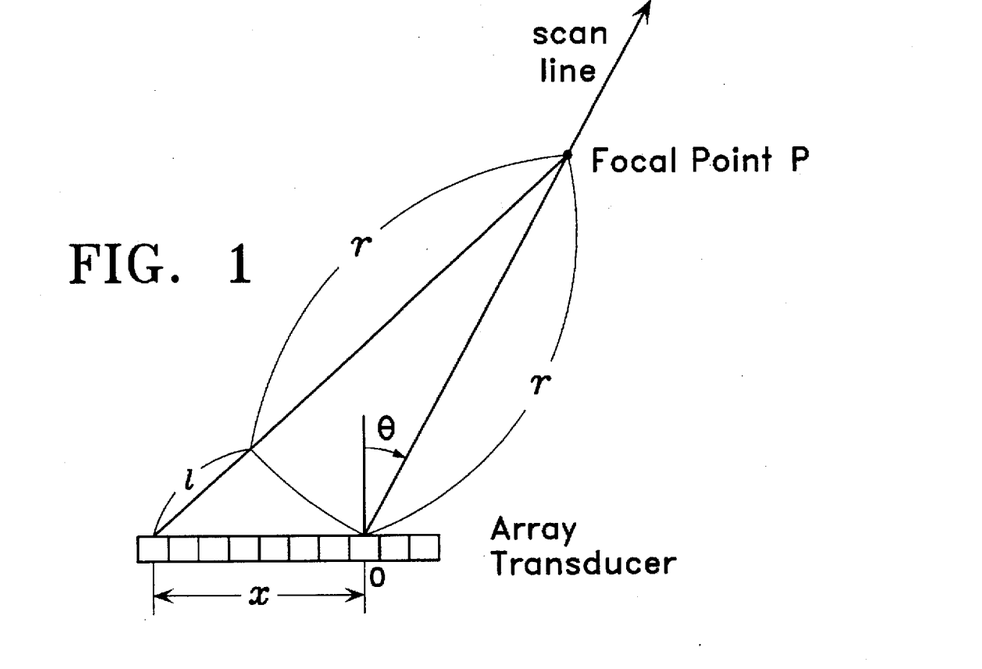
FIG. 1 illustrates the geometry employed to determine the focusing delay of a phased ultrasound array.

FIG. 1 illustrates the geometry employed to determine the focusing delay of a phased ultrasound array, where the center of the transducer is located at a reference point, such as the origin, point P denotes the focal point, r the radial distance from the array center to the focal point, θ the beam steering angle, which is usually zero in a linear array, and x the coordinate of a transducer element center with respect to a reference transducer element. In a non-attenuating medium, the focusing delay of the element at x with respect to the reference element is the relative delay l/v, where l is the differential path length with respect to the reference point and v is the velocity of sound in the medium. The variable l will be interchangeably referred to herein as the differential path length or the corresponding relative delay (which is actually l/v), the meaning being understood from the context. As is known in the art, the ultrasound phased array compensates for this relative delay through digital or analog delay techniques at each transducer element.

The differential path length l may be calculated as $$l=(r^2+x^2+2rx \sin \theta)^{1/2}-r$$

where r is variable, whereas θ is invariant throughout a scan line, and x is fixed for a given element.

Direct computation of the relative delay (path length) equation in real time is impractical because of the time-consuming operations of multiplying and taking the square root. Accordingly, numerical methods have been applied to the equation to simplify its calculation. One such method is the midpoint algorithm described in K. Jeon, et al., "An Efficient Real Time Focusing Delay Calculation In Ultrasonic Imaging Systems," Ultrasonic Imaging, Vol. 16, No. 4, pp. 231–248, October 1994.

Briefly, the application of the midpoint algorithm to the delay calculation is explained with reference to the l-r curve of FIG. 2. The variable l' represents the estimated quantized values of the relative delay (differential path length), whereas the subscripted r variable represents the range samples corresponding to the sampling period $t_s=r/2v$. The algorithm assumes that the curve is expressed as $$f(r,l)=0$$

and that it satisfies the following conditions:

$$\frac{-1}{K} \leq \frac{dl}{dr} \leq 0$$

where $$K = \frac{\text{phase resolution (in } l\text{)}}{\text{range resolution (in } r\text{)}},$$

so that l and Kr have the same units, and $$f(r,l+\delta) \leq 0 \text{ for } \delta \leq 0.$$

Here, $$f(r,l)=l^2+2lr-\alpha r-\beta$$

where $$\alpha=2x \sin \theta$$

$$\beta=x^2$$

The midpoint algorithm estimates the value of l as a function of r in the delay equation using only integer additions and subtractions. Heuristically, the midpoint algorithm chooses the quantized value l' as the nearest grid point to the actual l-r curve. Because the quantized values are uniformly spaced, the nearest l' value will be the one that is less than half a quantization level away from the l-r curve. Mathematically, the selection of l' is based upon the sign of a decision function $d_i$, which is defined by $$d_i=f(Kr_{i+1},l'_i-\tfrac{1}{2})$$

The decision function is evaluated at clock cycle i, and is used to determine the value of l' at the next clock cycle i+1. Referring to FIG. 2, the heavily dotted gridpoints represent the estimated relative delay values l' determined by the midpoint algorithm. According to the algorithm, the value of l' for a particular quantized range value is chosen as the previous value of l' or the previous value of l' decremented by one time unit (or corresponding distance unit). The relative delay is decremented at i+1 if $d_i>0$. The constraint that l can be decremented by only one unit results from the required slew rate assumption that $$\frac{-1}{K} \leq \frac{dl}{dr} \leq 0$$

This constraint affects both sampling rate (range resolution), phase (delay) resolution and azimuthal resolution. First, for a given phase resolution, the constraint affects the rate at which the received echo signal must be sampled. Referring to the example of FIG. 2, the spacing between successive r values represents a particular sampling clock period. In this example employing that period, the midpoint algorithm closely approximates the l-r curve where the quantized delay l' is decremented by one delay quantum (one "bump"). However, it may be difficult for the delay compensation hardware to compute the relative delay fast enough within the same time period between successive values of r.

If the sampling rate is decreased to accommodate more computation time, then the spacing between r values increases as well. In that case, the basic midpoint algorithm introduces unacceptable errors at close ranges where the slope of the l-r carve is steep. At a steep slope, the change in l during the longer clock period accordingly may be much greater than one, exceeding the ability of the "one bump" quantized delay l' to track the curve. Consequently, phase resolution is effectively degraded.

Jeon et al. recognized this problem, and extended the midpoint algorithm to select a quantized delay value not from between only two points, but from among three points. The extended algorithm relaxed the slew rate constraint to $$\frac{-2}{K} \leq \frac{dl}{dr} \leq 0$$

This new constraint allows the sampling clock to be run at half-speed relative to the basic algorithm. However, a drawback of this extended midpoint algorithm is that it requires computations for a second decision function in order to determine which of the three estimated delay points should be selected. As a result, hardware complexity increases rapidly with the number of l' choices when using this algorithm.

The slew rate constraint also limits phase resolution in l. Assume a given sampling rate of the received echo signal. As phase resolution is increased for better contrast resolution, the slope between the more finely quantized delay units effectively becomes steeper within the same range sampling period. Similarly, the slew rate limits the ability to use low optical F numbers for obtaining high azimuthal resolution. Lower F numbers are associated with steeper slopes. As before, the "one bump" scheme may not be able to track these steep curves. Further, using the Jeon et al. extended algorithm to handle these situations would suffer the same drawbacks as in the previous case.

Application of similar techniques to a phased array ultrasound beamformer is described in European Patent Application EP 0 696 792 A2, published on Feb. 14, 1996 (Application No. 95106140.7), and filed on Apr. 24, 1995, with a United States priority date of Aug. 9, 1994, Ser. No. 287,971 (Beaudin, et al.). The algorithm employed in that application is constrained to a maximum change in the relative delay of one delay quantum per sampling clock period.

Based on the disadvantages of the prior art, it is desired to compute the estimated relative delay simply and efficiently, while at the same time maintaining a high quality image as the ultrasound beamformer dynamically increases its focal depth.

SUMMARY OF THE INVENTION

To overcome the disadvantages of the prior art, the present invention provides a method and apparatus for distributed focus control with slope tracking. The invention operates in the context of an ultrasonic imaging system having an array of transducers. Each transducer converts received energy into an echo signal. A beamformer of the invention dynamically focuses the received energy. The beamformer includes delay computation circuitry for computing a delay function for the echo signal at a predetermined focal range. The delay of the echo signal with respect to range has a slope. Tracking circuitry varies the delay function to track the slope, thereby determining the delay function for a next focal range. The beamformer further comprises delay circuitry for compensating for the delay function of the echo signal.

The delay function is an estimated relative delay with respect to a reference delay of an echo signal from a reference transducer. Alternatively, the delay function is a compensating delay adapted to be applied to the echo signal of the transducer for which the delay function is being computed.

In another embodiment, the beamformer includes decision circuitry for selecting an update value from a set of update values. Delay computation circuitry updates a delay function of the echo signal for a predetermined focal range by the selected update value to thereby provide a delay function for a next focal range. Tracking circuitry varies the plurality of update values as a function of range.

In yet another embodiment, decision circuitry selects an update value from a set of update values, where the set includes a first update value and the first update value modified by a change value. The first update value can be nonzero. Delay computation circuitry updates a delay function of the echo signal for a predetermined focal range by the selected update value to thereby provide a delay function for a next focal range.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a method and apparatus for distributed focus control with slope tracking. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

Figure 3:
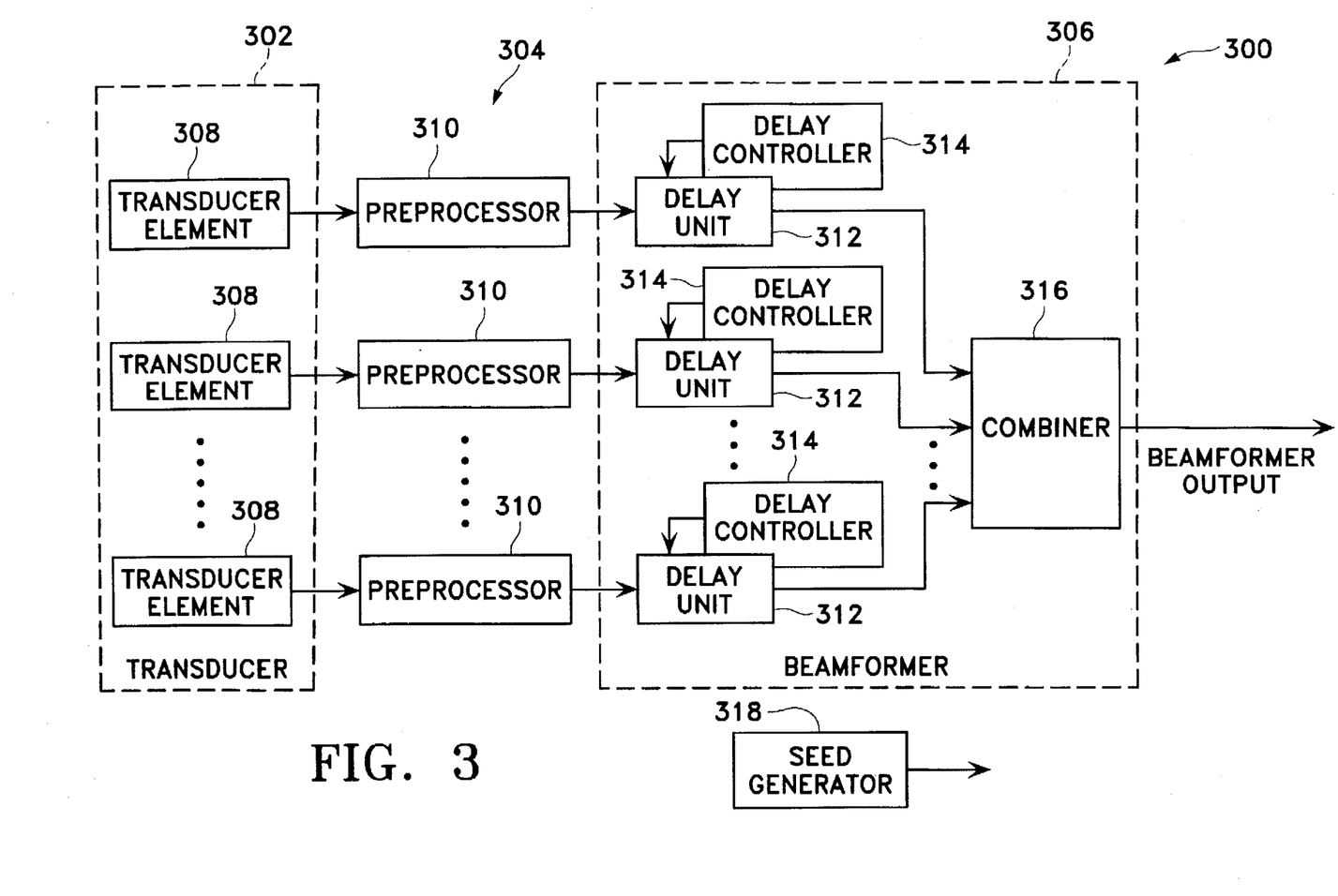
FIG. 3 is a simplified block diagram of a phased-array ultrasound scanner.

FIG. 3 is a simplified block diagram of an ultrasound scanner 300. The scanner transmits ultrasound energy into an object and receives reflected ultrasound energy. The energy is transmitted and received along a number of scan lines. Sector scan patterns, linear scan patterns and other scan patterns known to those skilled in the art can be utilized. By appropriately delaying the pulses applied to each transducer element, a focused ultrasound beam is transmitted into the object at a given steering angle. Conversely, the reflected ultrasound energy from a given point within the object is received by the transducer elements at different times, as represented by the differential path length (relative delay) l. The scanner accounts for these relative delays, so as to control the receive sensitivity pattern and thereby focus and steer the received ultrasound energy. Note that the transmitter section of the ultrasound scanner is omitted from FIG. 3 to avoid obscuring the figure.

The scanner includes an ultrasound transducer 302 that provides electrical signals to pre-processing circuitry 304. The pre-processing circuitry 304 supplies pre-processed signals to a beamformer 306. The transducer 302 includes an array of transducer elements 308. The transducer elements 308 are typically arranged in a linear or curvilinear array. Commercial transducer arrays typically include 128 elements, but the invention is applicable to any number of transducer elements. Each element converts the received ultrasound energy into an electrical signal.

Each electrical signal is pre-processed by a signal pre-processing circuit 310, and the pre-processed signal is input to the beamformer 306. Each signal pre-processor 310 amplifies and filters the analog signal from the associated transducer element 308. The pre-processor 310 may also perform digital or analog sampling of the analog signal.

The beamformer 306 may include a separate processing channel for each transducer element 308. The beamformer 306 processes the electrical signals so as to control the receive sensitivity pattern and thereby focus and steer the received ultrasound energy. The depth and steering angle of the focal point relative to the ultrasound transducer is varied dynamically with time (range) by appropriately delaying the received signals from each of the transducer elements.

Figure 4:
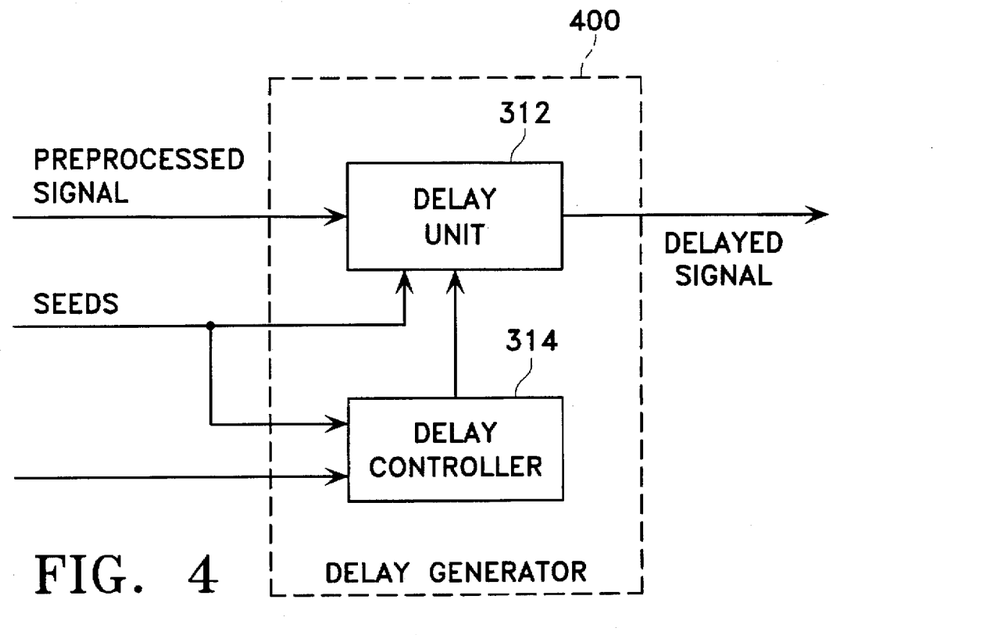
FIG. 4 is a simplified block diagram of a delay generator.

The beamformer includes a delay unit 312 and a delay controller 314 for each processing channel, and also includes a combining circuit 316. The delay unit 312 and the delay controller 314 together form a delay generator 400, as shown in FIG. 4. The delay unit 312 receives a pre-processed echo signal from a corresponding pre-processor 310. The echo signal received by the delay unit 312 can be a continuous analog signal, a sampled analog signal or a digital signal. The delay circuitry 312 for each type of signal is known in the art. The delay unit 312 applies a delay to the echo signal, and supplies the delayed signal to the combining circuit 316. As is known in the art, the delay circuitry 312 can perform a time delay adjustment, a phase adjustment or a combination of both. The combining circuit 316 may perform a simple summing of the delayed signals from the delay units, form a weighted sum of the signals, or perform a more complex combining function.

The delay controller 314 controls the delay of the delay unit 312. A seed generator 318 supplies initial delay coefficients and other control information to the delay unit 312 and the delay controller 314. These delay coefficients represent the initial delay for a transducer element 308 to focus at a particular starting depth and steering angle. The generation of this seed information will be discussed in detail below. The delay controller 314 updates the delay of the delay unit 312 for subsequent clock cycles after the initial starting time.

To compensate for the relative delay of a particular transducer element 308 through coherent addition in the combining circuit 316, the delay itself is first determined. After the delay is calculated, the delay controller 314 effectively applies the negative of the delay with respect to the reference element in order to achieve compensation. For example, if the relative delay of the transducer element that is farthest from the reference element within the aperture is 3 microseconds, then the delay controller 314 compensates for this delay by effectively advancing the receipt of the echo signal at the transducer element. This can be accomplished by delaying the signal at the reference element by 3 microseconds, while applying no delay to the transducer element farthest from the reference element. Similarly, the appropriate delay is added to the intervening elements between the reference element and the farthest element so that all elements delay the echo signal the same amount as the farthest element, e.g., 3 microseconds.

In general, the compensating delay Q applied by the delay unit 312 to the echo signal received by an element x for a given scan line at a given range is expressed as $$Q_x = l_{max} - l_x$$

where $l_{max}$=relative delay at the farthest element, and $l_x$=relative delay at element x.

The algorithm embodiment described below is employed to calculate an estimated relative delay l'. However, using the expression for Q, those skilled in the art will understand that the compensating delay Q may be calculated directly by the algorithm below by accounting for the $l_{max}$ offset without calculating an intermediate value for $l_x$. The algorithm can thus be easily adapted to compute either the l or Q values or any other intermediate value ultimately used to arrive at the compensating delay Q. All such values, including l and Q, will be referred to herein as "delay functions."

Figure 5:
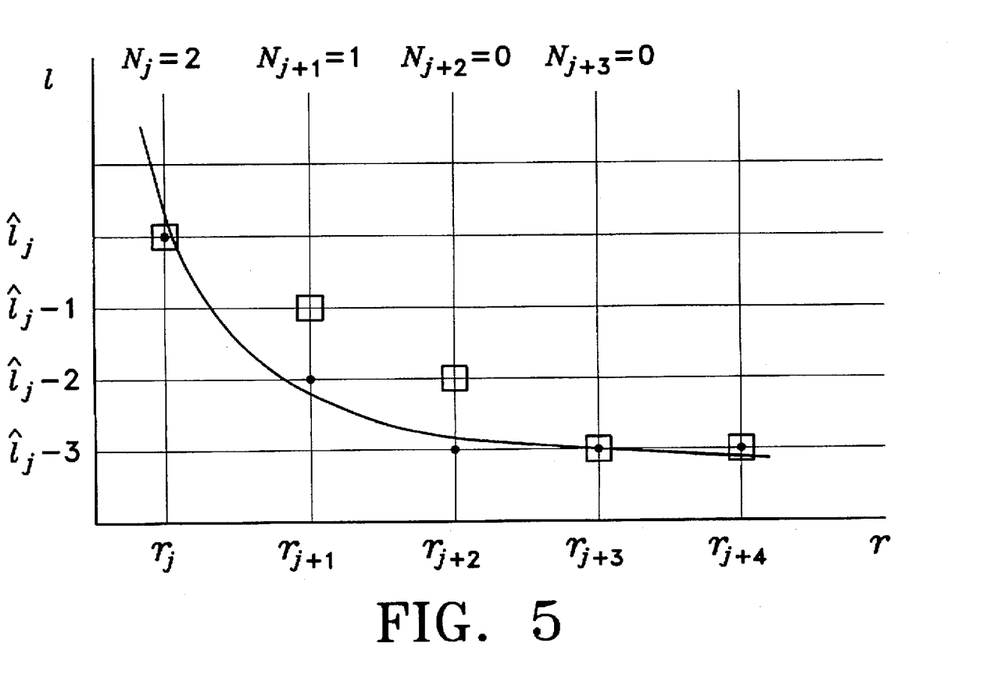
FIG. 5 illustrates the relationship between differential path length and range at half the sampling rate of FIG. 2.

As discussed above, numerical methods may be applied in order to achieve rapid real-time delay compensation. One such method is the midpoint algorithm. However, the basic midpoint algorithm does not accommodate changes in l' greater than one unit delay (one "bump") during a clock period, e.g., between i and i+1. For example, FIG. 5 is identical to FIG. 2, except that the range axis has been expanded by a factor of two, i.e., the sampling clock speed has been divided by two (range resolution reduced), whereas the delay resolution remains the same. Reducing the sampling rate allows more time for delay compensation computations.

The heavy dots at the grid intersections represent the nearest integer approximations to the l-r curve. Note that the best approximation for the time period between cycles j and j+1 requires that l' be decremented by two delay units. Because the slope flattens as j increases, the next time period only requires that l' be decremented by one unit.

As indicated by squares at the grid intersections, the basic midpoint algorithm exhibits a large error because of the "one-bump" constraint. At j+1, the error is greater than one delay unit. This error propagates to cycle j+2, even though the slope has flattened significantly.

Figure 2:
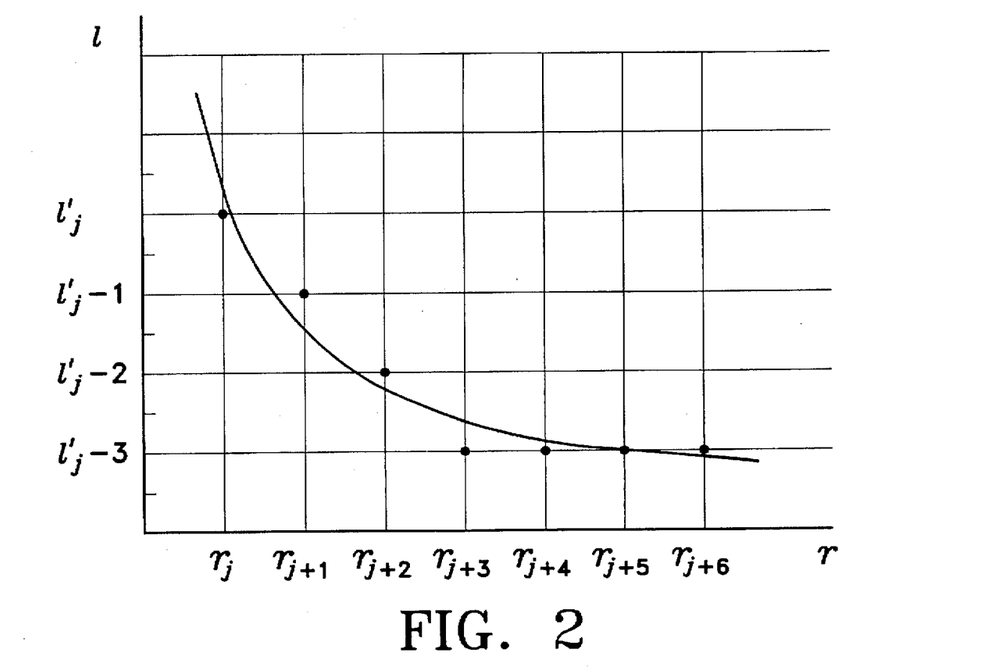
FIG. 2 illustrates the relationship between differential path length and range for a given sampling rate.
Figure 6:
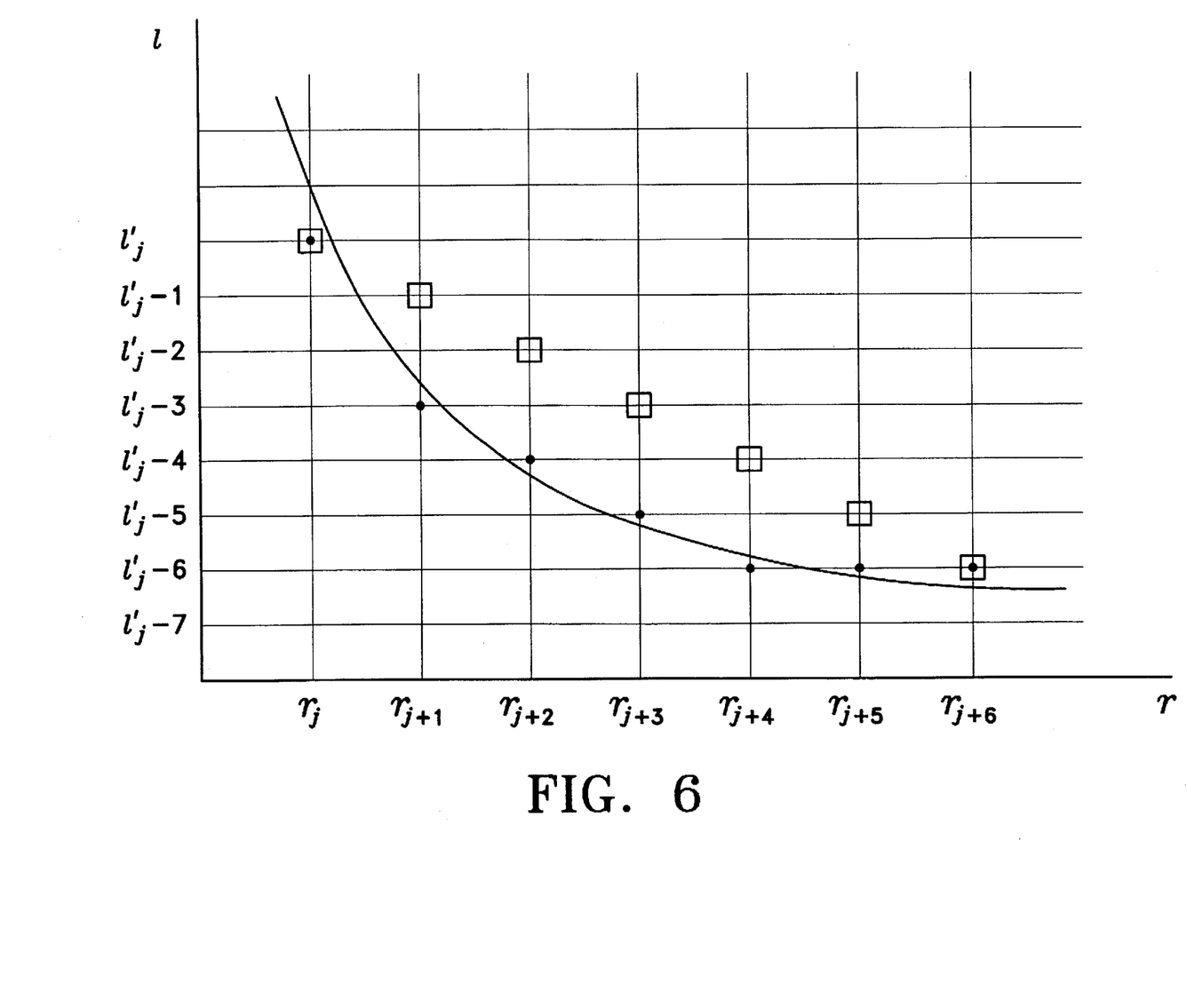
FIG. 6 illustrates the relationship between differential path length and range at twice the phase resolution of FIG. 2.

As another example, FIG. 6 is identical to FIG. 2, except that the delay resolution has been increased by a factor of 2. This has the effect of increasing the slope between range samples. Here, the best approximation for the time between j and j+1 requires that l' be decremented by three delay units. Again, the "one bump" midpoint algorithm cannot track the curve, resulting in a large error that propagates over time.

Finally, the F number of the beamformer lens affects the slope of the l-r curve. To maintain a constant depth of field, the F number is generally held constant as range increases by widening the transducer aperture.

$$F = \frac{range}{\text{effective aperture size}}$$

$$= \frac{r}{2x\cos\theta}$$

where x is the transducer element for which the relative delay is being computed. Note that x for each channel remains fixed even though the aperture is widened as receiving focal range is increased. In terms of x, $$x = \frac{r}{2F\cos\theta}$$

Recall that $$l = (r^2 + x^2 + 2rx\sin\theta)^{1/2} - r$$

Using a Taylor series approximation, $$l = x\sin\theta + \frac{x^2\cos^2\theta}{2r^2}$$

after taking the derivative, $$\frac{-dl}{dr} = \frac{x^2\cos^2\theta}{2r^2}$$

When a finer resolution is used for l than for r, then, accounting for K and combining these equations, $$\frac{-dl}{dr} = \frac{r^2\cos^2\theta}{(2F\cos\theta)^2} \cdot \frac{K}{2r^2} = \frac{K}{8F^2}$$

This is the worst case slope at the minimum range and represents an upper bound because slope flattens with range.

Note that this equation not only describes the effect of F number on slope, but also, through K (delay resolution/range resolution), encapsulates the effects of delay resolution and range resolution.

In an exemplary case where range resolution=$\lambda/2$, K=32 and F=2 the slew rate is bounded by $$\frac{-dl}{dr} \leq 1$$

Accordingly, the "one-bump" conventional midpoint algorithm sufficiently estimates the relative delay. However, at F=1, $$\frac{-dl}{dr} \leq 4$$

Therefore, at a low F number, the midpoint algorithm would fail because the one-bump technique cannot track such a steep slope. Most commercial beamformers cannot operate effectively at an F number below F=2. This limits azimuthal resolution.

The present invention overcomes the one-bump constraint, and closely approximates the nearest integer curve represented by the heavy dots, by dynamically tracking the slope of the actual relative delay curve. Rather than limiting the choice of the next l' value to l' or l'−1, the modified midpoint algorithm of the invention permits a choice between l'—$N_i$ and l'$_i$−$N_i$−1, where $N_i$ dynamically changes as the slope of the l-r curve flattens. In the degenerate case where $N_i=0$, the algorithm reduces to the basic midpoint algorithm. Conversely, in the example immediately above, a choice of $N_{max}=3$ would allow the beamformer to accommodate 3 or 4 bumps per cycle, thereby satisfying the F number and resolution requirements of the example.

Conceptually, this new paradigm must require a decision to be made at the midpoint between l'$_i$−$N_i$ and l'$_i$−$N_i$−1, i.e., at l'$_i$−$N_i$−½. Accordingly, $$\begin{aligned}d_i &= f(Kr_{i+1}, l'_i - N_i - 1/2) \\ &= l_i^2 + 2Kr_i l'_i + (2K - 2N_i - 1)l'_i - \\ &\quad (2N_i + 1 + \alpha)Kr_i - (2N_i + 1 + \alpha)K - \beta + 1/4 + N_i + N_i^2\end{aligned}$$

The decision function contains $l^2$ and lr terms. Therefore, the decision function cannot be evaluated each clock cycle using only simple addition and subtraction. However, the algorithm can be simplified by expressing the updated decision function $d_{i+1}$ as a function of $d_i$. The updating of the decision function falls into three cases. Where the slope does not change (within the limits of quantization error), e.g., between $r_{j+2}$ and $r_{j+3}$ in FIG. 5, $d_{i+1}$ may be calculated according to the following two cases.

Case 1: When the previous decision function $d_i \leq 0$, then the relative delay was decremented only by $N_i$ when advancing to cycle i+1. Accordingly, $$\begin{aligned}d_{i+1} &= f(Kr_{i+2}, l'_i - 2N_i - 1/2)\; d_i \leq 0 \\ &= d_i + 2(K - N_i)l'_i - 2N_i Kr_i - (6N_i + 1 + \alpha)K + N_i + 3N_i^2\end{aligned}$$

Case 2: Conversely, for $d_i > 0$, the relative delay l' was decremented by $N_i+1$. In that case, $$\begin{aligned}d_{i+1} &= f(Kr_{i+2}, l' - 2N_i - 3/2)\; d_i > 0 \\ &= d_i + 2(K - N_i - 1)l'_i - 2(N_i + 1)Kr_i - (6N_i + 5 + \alpha)K + \\ &\quad 2 + 5N_i + 3N_i^2\end{aligned}$$

Case 3: When the slope flattens, the value of N is decremented. For example, referring to FIG. 5, $N_j=2$, whereas $N_{j+1}=1$. When N is decremented, it is safe to assme that $d_i<0$, i.e., the delay l' has been decremented at i+1 by $N_j$, not $N_j+1$.

The present invention determines $N_i$ separately from the determination of l'$_i$. The present invention can track the slope in a variety of ways. For example, a table of $N_i$ vs. r values can be employed, but this technique requires a different table for each element for each scan line. Alternatively, the slope can be tracked by employing a separate midpoint algorithm, where a new decision function g(r, dl/dr)=0 is used to determine when $N_i$ should be decremented. In a preferred embodiment, the present invention calculates $N_i$ by monitoring the sign of a variable used to speed the computation of $d_i$ as described below.

For Case 3, when $d_i \leq 0$, $$\begin{aligned}d_{i+1} &= f(Kr_{i+2}, l'_i - N_i - N_{i+1} - 1/2)\; d_i \leq 0 \\ &= f(Kr_{i+2}, l'_i - 2N_i + 1/2) \\ &= d_i + 2(K - N_i + 1)l'_i - 2(N_i - 1)Kr_i - (6N_i - 3 + \alpha)K + N_i + 3N_i^2\end{aligned}$$

The decision function is calculated at each element by the delay controller 314. If $d_{i+1} \leq 0$, then the controller estimates the relative delay l' for the next clock cycle, i+2, as l'$_{i+1}$−$N_{i+1}$. If, however, $d_{i+1}>0$, then the controller estimates the delay as $l'_{i+1} - N_{i+1} - 1$. The delay controller 314 applies the appropriate compensating delay to the delay unit 312.

The delay controller 314 at each channel may be implemented as a state machine that performs different operations depending upon which of the above three cases is being implemented during a clock cycle. To summarize, the cases are:

1. No slope change, decrease l' by $N_i(d_i \leq 0)$ $$d_{i+1} = d_i + 2(K-N_i)l'_i - 2N_i K r_i - (6N_i + 1 + \alpha)K + N_i + 3N_i^2$$

2. No slope change, decrease l' by $N_i+1(d_i > 0)$ $$d_{i+1} = d_i + 2(K-N_i-1)l'_i - 2(N_i+1)K r_i - (6N_i + 5 + \alpha)K + 2 + 5N_i + 3N_i^2$$

3. Decrement slope, decrease l' by $N_i(d_i \leq 0$ assumed)

$$d_{i+1} = d_i + 2(K-N_i+1)l'_i - 2(N_i-1)K r_i - (6N_i - 3 + \alpha)K + N_i + 3N_i^2$$

All three cases require updates to $d_i$, which include multiplications of $N_i$ and $l'_i$, as well as $N_i$ and $r_i$, and numerous additions and subtractions. Because this arithmetic may limit the speed of the delay controller state machine, the present invention preferably defines additional state variables to parallelize the computations. Three additional state variables, $A_i$, $B_i$ and $C_i$, are defined as:

$$A_i = 2(K-N_i)l'_i - 2N_i K r_i - (6N_i + 1 + \alpha)K + N_i + 3N_i^2$$

$$B_i = 2(K-N_i-1)l'_i - 2(N_i+1)K r_i - (6N_i + 5 + \alpha)K + 2 + 5N_i + 3N_i^2$$

$$C_i = 2(K-N_i+1)l'_i - 2(N_i-1)K r_i - (6N_i - 3 + \alpha)K + N_i + 3N_i^2$$

so that, for each case:

1. $d_{i+1} = d_i + A_i$

2. $d_{i+1} = d_i + B_i$

3. $d_{i+1} = d_i + C_i$

As suggested above, $N_i$ can be updated by monitoring the sign of $A_i$. Conceptually, as slope flattens $l'_i$ will be decremented by $N_i$, not $N_{i+1}$. In that case, $d_i \leq 0$. Recall that the decision variable represents the rounding error of the path length difference. As range increases, the midpoint algorithm drives $d_i$ towards zero. Because $d_{i+1} = d_i + A_i$ when $d_i \leq 0$, then before $N_i$ is decremented, $A_i$ must be positive to pull $d_i$ towards zero. However, $A_i$ becomes less positive as range increases, and eventually becomes negative. An examination of the decision function equation reveals that $A_i$ must be positive during Case 1 to drive $d_i$ to zero. The $A_i$ equation reveals that $N_i$ must be decremented to prevent $A_i$ from becoming more negative, which would cause $d_i$ to diverge from zero. Accordingly, the delay controller decrements $N_i$ when $A_i$ crosses from a positive to a negative value.

The updating of these new variables can be simplified by expressing the updated variable in terms of the previous value of the variable, as was done for $d_{i+1}$.

This parallelism results in the following state equations:

1.

$r_{i+1} = r_i + 1$ $l'_{i+1} = l'_i - N_i$ $N_{i+1} = N_i$ $d_{i+1} = d_i + A_i$ $A_{i+1} = A_i - 2(2K - N_i)N_i$ $B_{i+1} = B_i - 2(2K - N_i - 1)N_i - 2K$ $C_{i+1} = C_i - 2(2K - N_i + 1)N_i + 2K$

2.

$r_{i+1} = r_i + 1$ $l'_{i+1} = l'_i - N_i - 1$ $N_{i+1} = N_i$ $D_{i+1} = d_i + B_i$ $A_{i+1} = A_i - 2(2K - N_i - 1)N_i - 2K$ $B_{i+1} = B_i - 2(2K - N_i - 1)(N_i + 1)$ $C_{i+1} = C_i - 2(2K - N_i)N_i - 2$

3.

$r_{i+1} = r_i + 1$ $l'_{i+1} = l'_i - N_i$ $N_{i+1} = N_i - 1$ $d_{i+1} = d_i + C_i$ $A_{i+1} = A_i + 2l'_i + 2K r_i - 2(2K - N_i + 4)N_i + 8K + 2$ $B_{i+1} = B_i + 2l'_i + 2K r_i - 2(2K - N_i + 3)N_i + 6K - 2$ $C_{i+1} = C_i + 2l'_i + 2K r_i - 2(2K - N_i + 5)N_i + 10K + 2$

From a computational standpoint, the Case 1 and 2 updates require the addition of terms including constats and $N_i$ and $N_i^2$ terms. If $N_i$ has a large bit width, then squaring that term could substantially slow down the update computation. However, for practical purposes, the maximum slope of the l-r curve is in the range of three to seven, assuming a maximum slew rate of four or eight. Accordingly, $N_i$ is only two or three bits wide. Thus, the update terms involving $N_i$ can be quickly calculated in real time using traditional arithmetic circuits, such as multipliers and adders. However, the present invention preferably uses a small lookup table to calculate the value of $N_i^2$ rapidly.

Further, the expressions include $N_i K$ terms multiplied by a factor of 2. Recall that K is the ratio of phase resolution to range resolution. Typically, those resolutions are each expressed as a fraction of $\lambda$, i.e., $\lambda/n$, where $\lambda$ is the wavelength of the ultrasound signal emitted by the transducer elements and n is a power of 2. Accordingly, as a ratio of those resolutions, K is also a power of 2. Thus, multiplication by K, and of course, multiplication by 2, can be implemented using only digital shifting, or by incorporating the results of the multiplications of those factors into the look-up table. Accordingly, no real-time multiplications are necessary.

As for Case 3, the update calculations for the A, B, and C state variables all involve a $(2l'_i + 2Kr_i)$ term. Again, because K is a power of 2, the $(2l'_i + 2Kr_i)$ term requires only simple shifting and summing. Using a lookup table to calculate the $N_i^2$ and $N_i K$ terms, and a shifter/adder to calculate the $(2l'_i + 2Kr_i)$ term, those skilled in the art could construct a state machine for the delay controller to update all the state variables. If, however, the $r_i/l'_i$ shifter/adder path is much slower than the lookup table, then another degree of parallelism can be incorporated into the state machine to speed up the updates. This parallelism introduces a new state variable, $E_p$, as follows:

$$E_i = 2l'_i + 2K r_i$$

The state equations become: 1.

$r_{i+1} = r_i + 1$ $l'_{i+1} = l'_i - N_i$ $N_{i+1} = N_i$ $d_{i+1} = d_{i+A_i}$ $A_{i+1} = A_i - 2(2K - N_i)N_i$ $B_{i+1} = B_i - 2(2K - N_i - 1)N_i - 2K$ $C_{i+1} = C_i - 2(2K - N_i + 1)N_i + 2K$ $E_{i+1} = E_i - 2N_i + 2K$

2.

$r_{i+1} = r_i + 1$ $l'_{i+1} = l'_i - N_i - 1$ $N_{i+1} = N_i$ $d_{i+1} = d_i + B_i$ $A_{i+1} = A_i - 2(2K - N_i - 1)N_i - 2K$ $B_{i+1} = B_i - 2(2K - N_i - 1)(N_i + 1)$ $C_{i+1} = C_i - 2(2K - N_i)N_i - 2$ $E_{i+1} = E_i - 2N_i + 2K - 2$

3.

$r_{i+1} = r_i + 1$ $l'_{i+1} = l'_i - N_i$ $N_{i+1} = N_i - 1$ $d_{i+1} = d_i + C_i$ $A_{i+1} = A_i + E_i - 2(2K - N_i + 4)N_i + 8K + 2$ $B_{i+1} = B_i + E_i - 2(2K - N_i + 3)N_i + 6K - 2$ $C_{i+1} = C_i + E_i - 2(2K - N_i + 5)N_i + 10K + 2$ $E_{i+1} = E_i - 2N_i + 2K$

Figure 7:
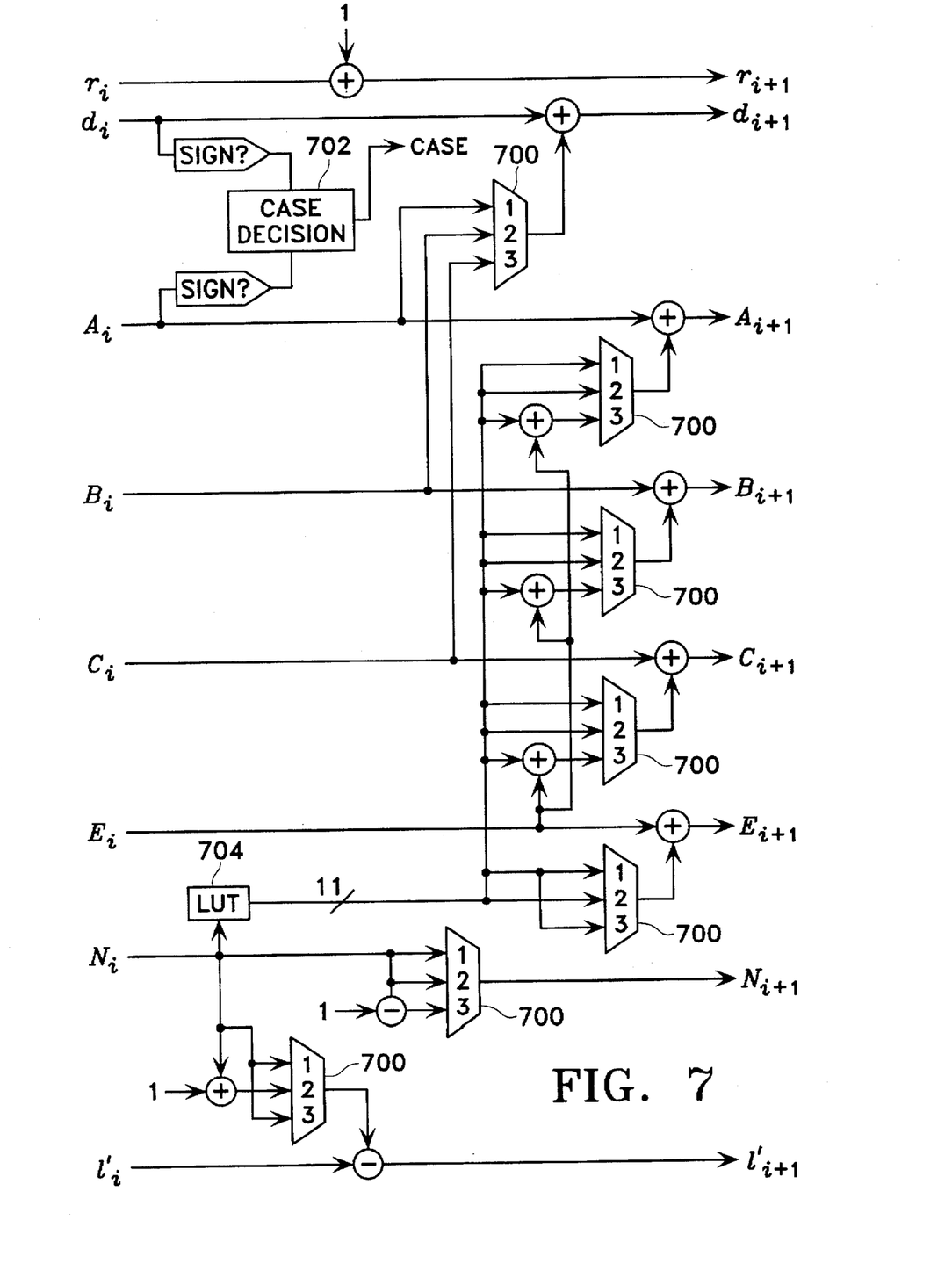
FIG. 7 illustrates an embodiment of a delay controller state machine according to the present invention.

FIG. 7 illustrates an embodiment of a delay controller state machine that implements the above state equations. The figure is essentially self-explanatory in light of the equations, but a few highlights are noted. First, those skilled in the art will understand that each updated state variable is stored in a register (not shown), and that the output of the register is fed back to the input of the state machine. For example, the updated delay variable $l'_{i+1}$ is stored in a register. The output of the register is fed back as the input delay variable $l'_i$. Further, those skilled in the art will understand that the input selection of each multiplexer 700 is controlled by the case, i.e., Case 1, 2 or 3, determined by a case decision logic circuit 702. This determination is based solely on the signs of $d_i$ and $A_i$. This represents a dramatic improvement in computational efficiency over various prior art techniques.

Finally, a lookup table 704 has eleven different outputs to provide the differential terms $A_{i+1} - (A_i + E_i)$, $B_{i+1} - (B_i + E_i)$, $C_{i+1} - (C_i + E_i)$ and $E_{i+1} - E_i$, respectively, for the three cases of the state equations. The outputs exhibit various bit widths, depending upon the bit widths of K and the maximum value of $N_i$. K is preferably fixed, but could be variable, in which case K would be an additional input to the lookup table 704.

Those skilled in the art will understand that FIG. 7 is a simple, conceptual diagram employed for illustrative purposes, and that logic reduction techniques known in the art can be utilized to reduce the complexity and improve the throughput of the delay controller state machine.

Seed Generation

The seed generation process of the present invention provides initial state variables to the delay generator to initialize the receive beamforming process. The parallelized version of the slope-tracking extension to the midpoint algorithm requires eight seeds. These values could all be calculated in the centralized seed generator. However, this scheme would require the seed generator to perform a complex set of calculations for eight seeds for each element for each scan line, and then distribute the seeds to all channels. Fortunately, it is not necessary to centrally calculate and distribute all eight seeds to the channels. The variables $A_0$, $B_0$, $C_0$ and $E_0$ are all functions of $r_0$, $l'_0$, $N_0$ and $\alpha$. A relatively simple microsequencer can be built into each channel to perform these computations locally so that only $r_0$, $l'_0$, $N_0$ and $\alpha$ need to be distributed from the centralized seed generator. Although these calculations may take a relatively long time, on the order of a scan line firing time, satisfactory performance is obtained as long as the seeds are loaded sufficiently far in advance of the receive process, allowing for a pipeline delay until the remaining seeds are calculated and loaded.

The seeds are calculated as follows. First, the seed generator computes $r_0$, $l'_0$, $N_0$ and $\alpha$ for each channel. The variable $r_0$ is the minimum (starting) range of the receive process, and is related to F number. Preferably, F number is maintained as a constant to achieve constant depth of field as r increases. For example, for a symmetric linear array transducer, at a particular transducer element (x), where x is expressed in the units of 1 (K multiplied by units of r), $r_0 = 2KxF \cos\theta$ $\alpha = 2x \sin\theta$ $\beta = x^2$ $l_o = (K^2 r_o^2 + \alpha K r_o + \beta)^{1/2} - K r_o$ The variables $\alpha$, $\beta$ and $l_0$ are rounded to the quantization precision of $l'$.

To calculate $N_0$, $N_0 = \dfrac{-dl}{dr}$ evaluated at $r_0$ and truncated.

Starting with $l^2 + 2Krl = \alpha Kr + \beta$ $2l\,dl + 2Kl\,dr + 2Kr\,dl = \alpha K\,dr$ $l\dfrac{dl}{dr} + Kl + Kr\dfrac{dl}{dr} = \dfrac{\alpha K}{2}$ $\dfrac{dl}{dr} = \dfrac{K\left(\dfrac{\alpha}{2} - l\right)}{l + Kr}$ Therefore, $$N_0 = \text{truncate}\left[\frac{K\left(l_0 - \frac{\alpha}{2}\right)}{l_0 + Kr_0}\right]$$

An alternative method is to calculate $$N_0 = \text{truncate}(l_0 - l_1)$$
$$= [\text{truncate}((K^2 r_0^2 + \alpha K r_0 + \beta)^{1/2} - (K^2 r_1^2 + \alpha K r_1 + \beta)^{1/2})]$$

where $l_0$ and $l_1$ are the pre-quantization values.

After performing these calculations, the seed generator distributes $r_0$, $l'_0$, $N_0$ and $\alpha$ to the delay controllers, which each perform the following distributed seed calculations for each channel.

$$A_o = 2(K-N_0)l'_0 - 2N_0 Kr_0 - K(6N_0 + 1 + \alpha) + N_0 + 3N_0^2$$

$$B_o = 2(K-N_0-1)l'_0 - 2(N_0+1)Kr_0 - K(6N_0 + 5 + \alpha) + 2 + 5N_0 + eN_0^2$$

$$C_o = 2(K-N_0+1)l'_0 - 2(N_0-1)Kr_0 - K(6N_0 - 3 + \alpha) + N_0 + 3N_0^2$$

$$E_0 = 2l'_0 + 2Kr_0$$

The variables $B_0$ and $C_0$ reduce to $$B_0 = A_0 - 2l_0' - 2Kr_0 - 4K + 2 + 4N_0$$
$$= A_0 - E_0 - 4K + 2 + 4N_0$$

$$C_0 = A_0 + 2l_0' + 2Kr_0 + 4K$$
$$= A_0 + E_0 + 4K$$

As for the decision function, $$d_0 = f(Kr_1, l_0' - N_0 - 1/2)$$
$$= f(Kr_1, l_0' - N_0 - 1/2) - f(Kr_0, l_0') + f(Kr_0, l_0') - f(Kr_0, l_0)$$

because $f(Kr_0, l_0) = 0$.

The first two terms comprise an algorithmic term, and the second two terms a rounding term. As the algorithm progresses, the initial rounding terms' relevance rapidly shrinks. Thus, it can be dropped, which causes an initial increase in error which diminishes at greater depths. The remaining algorithmic term $$f(Kr_1, l'_0 - N_0 - \tfrac{1}{2}) - f(Kr_0, l'_0)$$

reduces to $$(2K - 2N_0 - 1)l'_0 - K(2N_0 + 1)r_0 - K(2N_0 + 1 + \alpha) + N_0 + N_0^2$$

after dropping an insignificant constant term. This expression further reduces to $$d_0 = B_0 + l_0' + Kr_0 + 4KN_0 + 4K - 2 - 4N_0 - 2N_0^2$$
$$= B_0 + E_0/2 + 4KN_0 + 4K - 2 - 4N_0 - 2N_0^2$$

Recall that $$N_0 = \text{truncate}\left[\frac{K\left(l_0 - \frac{\alpha}{2}\right)}{l_0 + Kr_0}\right]$$

Rather than computing this value centrally as before, it can be computed locally by counting the number of times $(l_0 + Kr_0)$ can be subtracted from $$\left(K\left(\frac{\alpha}{2} - l_0\right)\right)$$

before the result is negative.

At the shallowest depths, the slope may change so drastically that the algorithm of the invention cannot track the slope because N can only be decremented by 1 each cycle. This apparent problem is of no practical concern because the closest ranges contain no useful diagnostic information. In any event, technical limitations prevent the transducer from beginning reception until a few cycles after the transmission phase.

That said, this problem can be fixed in a number of ways. One simple fix requires that $r_0$ be increased by one range step when $d_i > 0$, $A_i < 0$. These conditions represent a state where $l$ should be decremented by N+1, yet N itself should be decremented. These conditions are clearly inconsistent as slope flattens, thereby requiring corrective action. By increasing the minimum range, which was strictly based on F number, this fix takes the algorithm out of the steep curve region causing the inconsistency. This action can be repeated, if necessary.

It has been shown that the seed generator 318 only needs to compute and distribute $r_0$, $l_0$, and $\alpha$ to the channels. The delay controller 314 within each channel then calculates the $d_0$, $N_0$, $A_0$, $B_0$, $C_0$, and $E_0$ seeds for each scan line. Those skilled in the art will recognize that the seed generation circuitry of the seed generator 318 and the delay controller 314 can be easily designed and constructed to implement the above equations using standard logic design techniques.

Although the invention has been described in conjunction with particular embodiments, it will be appreciated that various modifications and alterations may be made by those skilled in the art without departing from the spirit and scope of the invention. In particular, those skilled in the art will recognize that the present invention is not limited to one-dimensional linear arrays of transducers. From the point of view of each channel, no matter what the array geometry, the problem of dynamic focusing is limited in scope to one plane—that defined by the centerpoint of the transducer element whose signal it is processing, and the line defined by the acoustic scan. Therefore, any transducer geometry, including such well-known constructions as curved linear arrays and two-dimensional arrays, can be accommodated by appropriately transforming x and θ for each channel for each line.

Further, the invention has been described for straight lines, but by using the techniques disclosed in Beaudin et al., curved lines can be accommodated by warping. The present invention can also be adapted to account for the refractive effect in the x-r plane caused by a fixed transducer lens of the type commonly used to correct for the small path length differences in the z axis orthogonal to the x-r plane. Well-known techniques for skewing the focusing control to account for this effect in centralized beamformers can be adapted to skew the seeds of the distributed beamformer of the present invention.

The description of the invention given above addresses the geometric portion of dynamic focus computations. The present invention can also easily incorporate well-known techniques to compensate for additional effects, such as the apparent center frequency downshift caused by attenuation of higher frequencies at greater depths. Similarly, the present invention may also incorporate adaptive techniques to account for delay nonuniformity in tissue. Such techniques are taught in U.S. patent application Ser. No. 08/286,664, filed Aug. 5, 1994, "Method and Apparatus for a Geometric Aberration Transform in an Adaptive Focusing Ultrasound Beamformer System," assigned to the assignee of the present invention. That application is incorporated by reference herein. Compensation for both effects would be added to the geometric compensation of the delay unit.

In yet another embodiment, multiplexing techniques for accommodating multiple receive beams may be employed in the present invention. Finally, each channel may serve more than one element, in which case the present invention may incorporate techniques taught in U.S. patent application Ser. No. 08/534,993, filed Sep. 8, 1995, "Ultrasonic Receive Beamformer with Phased Sub-Arrays," assigned to the assignee of the present invention. That application is incorporated by reference herein.

What is claimed is:

1. In an ultrasonic imaging system having an array of transducers, each transducer for converting received energy into an echo signal, a method for dynamically focusing the received energy, the method comprising the steps of:
   computing a delay function for the echo signal at a predetermined focal range, wherein a delay of the echo signal with respect to range has a slope; and
   varying the delay function to track the slope, thereby determining the delay function for a next focal range.

2. The method of claim 1, further comprising the step of compensating for the delay function of the echo signal.

3. The method of claim 1, wherein the delay function is an estimated relative delay with respect to a reference delay of an echo signal from a reference transducer.

4. The method of claim 1, wherein the delay function is a compensating delay adapted to be applied to the echo signal of the transducer for which the delay function is being computed.

5. The method of claim 1, wherein
   the computing step comprises the step of updating a previous delay function computed for a previous focal range by an update value, and
   the varying step comprises the step of varying the update value as a function of the slope.

6. In an ultrasonic imaging system having an array of transducers, each transducer for converting received energy into an echo signal, a method for dynamically focusing the received energy, the method comprising the steps of:
   selecting an update value from a plurality of update values;
   updating a delay function of the echo signal for a predetermined focal range by the selected update value to thereby provide a delay function for a next focal range; and
   varying the plurality of update values as a function of range.

7. The method of claim 6, further comprising the step of compensating for the delay function of the echo signal.

8. The method of claim 6, wherein the delay function is an estimated relative delay with respect to a reference delay of an echo signal from a reference transducer.

9. The method of claim 6, wherein the delay function is a compensating delay adapted to be applied to the echo signal of the transducer for which the delay function is being computed.

10. The method of claim 6, wherein a delay of the echo signal with respect to range has a slope, the varying step comprising the step of varying the plurality of update values as a function of the slope.

11. The method of claim 6, wherein the plurality of update values comprises a first update value and the first update value modified by a change value, and the first update value can be nonzero.

12. In an ultrasonic imaging system having an array of transducers, each transducer for converting received energy into an echo signal, a method for dynamically focusing the received energy, the method comprising the steps of:
   selecting an update value from a plurality of update values, wherein the plurality of update values comprises a first update value and the first update value modified by a change value, wherein the first update value can be nonzero; and
   updating a delay function of the echo signal for a predetermined focal range by the selected update value to thereby provide a delay function for a next focal range.

13. The method of claim 12, further comprising the step of compensating for the delay function of the echo signal.

14. The method of claim 12, wherein the delay function is an estimated relative delay with respect to a reference delay of an echo signal from a reference transducer.

15. The method of claim 12, wherein the delay function is a compensating delay adapted to be applied to the echo signal of the transducer for which the delay function is being computed.

16. The method of claim 12, wherein the plurality of update values varies as a function of range.

17. The method of claim 12, wherein a delay of the echo signal with respect to range has a slope, wherein the plurality of update values varies as a function of the slope.

18. The method of claim 12, wherein all the update values can simultaneously be nonzero.

19. In an ultrasonic imaging system having an array of transducers, each transducer for converting received energy into an echo signal, a beamformer for dynamically focusing the received energy, the beamformer comprising:
   delay computation circuitry for computing a delay function for the echo signal at a predetermined focal range, wherein a delay of the echo signal with respect to range has a slope; and
   tracking circuitry for varying the delay function to track the slope, thereby determining the delay function for a next focal range.

20. The beamformer of claim 19, further comprising delay circuitry for compensating for the delay function of the echo signal.

21. The beamformer of claim 19, wherein the delay function is an estimated relative delay with respect to a reference delay of an echo signal from a reference transducer.

22. The beamformer of claim 19, wherein the delay function is a compensating delay adapted to be applied to the echo signal of the transducer for which the delay function is being computed.

23. The beamformer of claim 19, wherein
   the delay computation circuitry comprises means for updating a previous delay function computed for a previous focal range by an update value, and the tracking circuitry comprises means for varying the update value as a function of the slope.

24. In an ultrasonic imaging system having an array of transducers, each transducer fox converting received energy into an echo signal, a beamformer for dynamically focusing the received energy, the beamformer comprising:

decision circuitry for selecting an update value from a plurality of update values;

delay computation circuitry for updating a delay function of the echo signal for a predetermined focal range by the selected update value to thereby provide a delay function for a next focal range; and tracking circuitry for varying the plurality of update values as a function of range.

25. The beamformer of claim 24, further comprising delay circuitry for compensating for the delay function of the echo signal.

26. The beamformer of claim 24, wherein the delay function is an estimated relative delay with respect to a reference delay of an echo signal from a reference transducer.

27. The beamformer of claim 24, wherein the delay function is a compensating delay adapted to be applied to the echo signal of the transducer for which the delay function is being computed.

28. The beamformer of claim 24, wherein a delay of the echo signal with respect to range has a slope, the tracking circuitry comprising means for varying the plurality of update values as a function of the slope.

29. The beamformer of claim 24, wherein the plurality of update values comprises a first update value and the first update value modified by a change value, and the first update value can be nonzero.

30. In an ultrasonic imaging system having an array of transducers, each transducer for converting received energy into an echo signal, a beamformer for dynamically focusing the received energy, the beamformer comprising:

decision circuitry for selecting an update value from a plurality of update. values, wherein the plurality of update values comprises a first update value and the first update value modified by a change value, wherein the first update value can be nonzero; and delay computation circuitry for updating a delay function of the echo signal for a predetermined focal range by the selected update value to thereby provide a delay function for a next focal range.

31. The beamformer of claim 30, further comprising delay circuitry for compensating for the delay function of the echo signal.

32. The beamformer of claim 30, wherein the delay function is an estimated relative delay with respect to a reference delay of an echo signal from a reference transducer.

33. The beamformer of claim 30, wherein the delay function is a compensating delay adapted to be applied to the echo signal of the transducer for which the delay function is being computed.

34. The beamformer of claim 30, wherein the plurality of update values varies as a function of range.

35. The beamformer of claim 30, wherein a delay of the echo signal with respect to range has a slope, and the plurality of update values varies as a function of the slope.

36. The method of claim 30, wherein all the update values can simultaneously be nonzero.

37. In an ultrasonic imaging system having an array of transducers, each transducer for converting received energy into an echo signal, a method for dynamically focusing the received energy, the method comprising the steps of:

selecting an update value from a plurality of update values;

incrementing a delay function of the echo signal for a predetermined focal range by the selected update value to thereby provide a delay function for a next focal range, wherein a delay of the echo signal with respect to range has a slope that flattens as range increases; and decreasing the update values in the plurality of update values as the slope flattens.

38. The method of claim 37, further comprising the step of compensating for the delay of the echo signal.

39. The method of claim 37, wherein all the update values can simultaneously be nonzero.

40. In an ultrasonic imaging system having an array of transducers, each transducer for converting received energy into an echo signal, a beamformer for dynamically focusing the received energy, the beamformer comprising:

decision circuitry for selecting an update value from a plurality of update values;

delay computation circuitry for incrementing a delay function of the echo signal for a predetermined focal range by the selected update value to thereby provide a delay function for a next focal range, wherein a delay of the echo signal with respect to range has a slope that flattens as range increases; and tracking circuitry for decreasing the update values in the plurality of update values as the slope flattens.

41. The beamformer of claim 40, further comprising delay circuitry for compensating for the delay of the echo signal.

42. The beamformer of claim 40, wherein all the update values can simultaneously be nonzero.

* * * * *